(12) United States Patent
Wildnauer et al.

(10) Patent No.: US 7,027,688 B2
(45) Date of Patent: Apr. 11, 2006

(54) TUNABLE OPTICAL FILTER BASED ON A PHYSICALLY-DEFORMABLE DIFFRACTIVE ELEMENT

(76) Inventors: Kenneth R. Wildnauer, 2478 Murdock Dr., Santa Rosa, CA (US) 95404-2207; Ian Hardcastle, 1601 California Ave., M/S 17L-5A, Palo Alto, CA (US) 94304; Thomas L. Mikes, 149 Bennett Rd., Ashby, MA (US) 01431

( * ) Notice: Subject to any disclaimer, the term of this patent is extended or adjusted under 35 U.S.C. 154(b) by 338 days.

(21) Appl. No.: 10/146,543

(22) Filed: May 14, 2002

(65) Prior Publication Data

US 2003/0215183 A1 Nov. 20, 2003

(51) Int. Cl.
*G02B 6/34* (2006.01)

(52) U.S. Cl. ....................................................... 385/37
(58) Field of Classification Search .................. 385/12, 385/24, 27, 30, 37
See application file for complete search history.

(56) References Cited

U.S. PATENT DOCUMENTS

| | | | |
|---|---|---|---|
| 3,942,048 A | | 3/1976 | Laude et al. |
| 4,142,774 A | * | 3/1979 | Wright ............................ 385/4 |
| 5,233,405 A | | 8/1993 | Wildnauer et al. |
| 5,462,176 A | * | 10/1995 | Hereford et al. ............. 209/577 |
| 5,982,963 A | * | 11/1999 | Feng et al. .................... 385/37 |
| 5,987,200 A | * | 11/1999 | Fleming et al. ............... 385/37 |
| 6,055,348 A | * | 4/2000 | Jin et al. ....................... 385/37 |
| 6,111,997 A | | 8/2000 | Jeong |
| 6,330,383 B1 | * | 12/2001 | Cai et al. ...................... 385/37 |
| 6,480,513 B1 | * | 11/2002 | Kapany et al. ............... 372/20 |
| 6,485,149 B1 | * | 11/2002 | Berg et al. ................... 359/615 |
| 6,544,257 B1 | * | 4/2003 | Nagase et al. ................ 606/15 |
| 6,665,076 B1 | * | 12/2003 | Watterson et al. .......... 356/454 |

FOREIGN PATENT DOCUMENTS

| | | |
|---|---|---|
| DE | 39 43 387 A1 | 7/1990 |
| EP | 0 859 249 A1 | 8/1998 |
| FR | 2 527 436 | 11/1981 |

* cited by examiner

*Primary Examiner*—Joseph Williams
*Assistant Examiner*—Peter Macchiarolo (57) ABSTRACT

The tunable optical filter includes an elastic substrate, a diffractive element in the elastic substrate, an actuator for stretching the elastic substrate to control the pitch of the diffractive element, a first optical path and a second optical path. The diffractive element optically couples the second optical path to the first optical path at an optical frequency determined by the pitch of the diffractive element.

22 Claims, 4 Drawing Sheets

TUNABLE OPTICAL FILTER BASED ON A PHYSICALLY-DEFORMABLE DIFFRACTIVE ELEMENT

BACKGROUND OF THE INVENTION

In multi-frequency optical communications systems, such as wavelength-division multiplexing (WDM) and dense wavelength-division multiplexing (DWDM) optical communication systems, and in other multi-frequency optical systems, the need to select an optical signal of a given frequency from among a number of optical signals of different frequencies often exists. Optical filters are often used to perform such optical signal selection. However, conventional optical filters such as thin film filters or diffraction gratings generally select an optical signal of a given optical frequency or the optical signals in a range of optical frequencies. Other conventional filters such as fiber Bragg gratings only work in reflection mode and have very narrow tuning range. These properties limit the applications in which such filters can be used. Furthermore, tunable etalon filters suffer from multiple-order responses that also limit the applications in which they can be used. Thus, conventional optical filters usually do not have the ability to select a desired optical signal rapidly, reproducibly, over a wide frequency range, at low cost and with low energy consumption. Moreover, conventional optical filters typically work only in reflection mode and may have multiple-order responses.

Thus, what is needed is a tunable optical filter that is capable of changing the frequency of the optical signal that is selected, or rejected, rapidly, reproducibly and at low cost.

SUMMARY OF THE INVENTION

The invention provides a tunable optical filter that includes an elastic substrate, a diffractive element in the elastic substrate, an actuator for stretching the elastic substrate to control the pitch of the diffractive element, a first optical path and a second optical path. The diffractive element optically couples the second optical path to the first optical path at an optical frequency determined by the pitch of the diffractive element.

DETAILED DESCRIPTION OF THE INVENTION

Figure 1A:
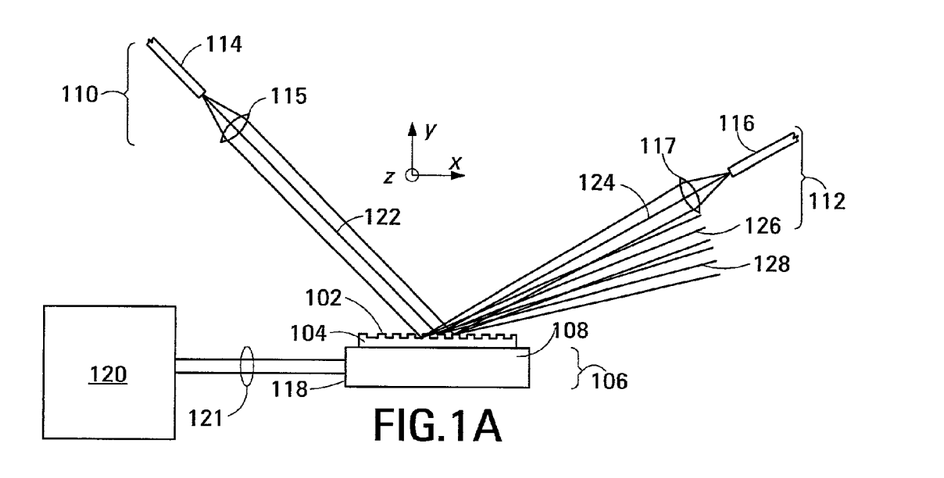
FIG. 1A is a schematic side elevation of first embodiment of a tunable optical filter according to the invention shown with a control signal having a first level applied to the actuator.

FIG. 1A shows a first embodiment 100 of a tunable optical filter according to the invention. The optical filter is composed of the diffraction grating 102 formed in the elastic substrate 104. The elastic substrate is coupled to the actuator 106 that operates to stretch the elastic substrate to determine the pitch of the diffraction grating. The optical filter is additionally composed of the input optical path 110 and the output optical path 112. The input optical path and the output optical path are optically coupled by the diffraction grating at an optical frequency determined by the pitch of the diffraction grating. The optical frequency at which the output optical path and the input optical path are optically coupled can be changed by stretching the elastic substrate to change the pitch of the diffraction grating.

The elastic substrate 104 is a layer of elastic material in which the diffraction grating 102 is formed. In the example shown, the elastic substrate is a layer of photoresist in which the diffraction grating is formed by photolithography, as is known in the art. The layer of photoresist may be supported by a thin sub-layer (not shown) of an elastic material such as metal, single-crystal silicon or glass. For wider tuning ranges, materials having a smaller Young's modulus, such as plastics, may be used as the support layer. After the diffraction grating has been formed in the elastic substrate, the surface of the substrate is coated with a thin layer of a metal, such as aluminum or gold, to increase the reflectivity of the diffraction grating.

The actuator 106 is composed of the piezoelectric chip 108. The piezoelectric chip has a major surface to which the elastic substrate 104 is bonded. In the example shown, the elastic substrate is bonded to the major surface of the piezoelectric chip by a layer of adhesive (not shown). The elastic substrate may alternatively be attached to the actuator in other ways. For example, photoresist may be spun onto or otherwise applied to the major surface of the piezoelectric chip prior to forming the diffraction grating in the photoresist. Part of the piezoelectric chip 108 is fixed. In the example shown, the end 118 is fixed. The remainder of the piezoelectric chip is free to move in the x-direction. Electrodes (not shown) supported by the piezoelectric chip, or otherwise arranged to apply an electric field to the piezoelectric chip, are electrically connected to the controller 120. The controller generates a control voltage that it applies to the electrodes of the piezoelectric chip via the conductors 121. The piezoelectric chip elongates in the x-direction in proportion to the control voltage. The piezoelectric chip elongating stretches the elastic substrate 104, also in the x-direction.

The input optical path 110 is composed of the optical fiber 114 and the converging element 115. The output optical path 112 is composed of the optical fiber 116 and the converging element 117. In the example shown, a convex lens is used as the converging elements 115 and 117. Each converging element may additionally or alternatively include a concave mirror, a diffractive optical element or an additional lens.

In the input optical path 110, the optical fibre 114 carries an optical signal to the tunable optical filter 100. The converging element 115 collimates light output by the optical fiber 114 into a parallel beam that illuminates the diffraction grating 102.

In the output optical path 112, the converging element 117 focuses the beam of light diffracted by the diffraction grating 102 into the output optical path onto the end of the optical fibre 116. The combination of the optical fibre 116 and the converging element 117 acts as a frequency-selective aperture.

The frequency-selective aperture selects the angular range of the light diffracted by the diffraction grating that enters the optical fiber 116. The selected angular range corresponds to the range of optical frequencies that is coupled to the output optical path from the input optical path at a given pitch of the diffraction grating. The center frequency of the optical frequency range is determined by the pitch of the diffraction grating. The optical frequency range of the frequency-selective aperture depends on the size and pitch of the diffraction grating, the size of the optical fiber 114, the size and the focal length of the converging element 115, the size of the optical fiber 116 and the size and the focal length of the converging element 117. For example, the optical frequency range of the frequency-selective aperture may be designed to be narrower than the frequency spacing between adjacent ones of the optical signals constituting a multi-frequency optical signal so that the tunable optical filter 100 can select only one of the optical signals at a time for output via the output optical path.

FIG. 1A shows an example in which a multi-frequency optical signal 122 is received via the input optical path 110. A typical example of a multi-frequency optical signal is a wavelength division multiplexed (WDM) or a dense wavelength division multiplexed (DWDM) optical signal. In the example shown, the multi-frequency optical signal is composed of the three, simultaneously-present optical signals 124, 126 and 128, each of which has a different optical frequency. Only three optical signals are shown to simplify the drawing. Practical WDM or DWDM signals are typically composed of many more optical signals. Each of the optical signals may be modulated to enable it to represent an information signal.

FIG. 1A shows the tunable optical filter 100 in a state in which control signal applied to the piezoelectric chip 108 by the controller 120 subjects the piezoelectric chip to minimal elongation. In this state, the elastic substrate 104 is minimally stretched, and the pitch of the diffraction grating 102, in terms of the distance between adjacent features, is a minimum. Typically, in this state, the level of the control signal is zero. Such a control signal subjects the piezoelectric chip to no elongation.

The input optical path 110 carries the multi-frequency optical signal 122 to the tunable optical filter 100. The input optical path is arranged to direct the multi-frequency optical signal onto the diffraction grating 102. The diffraction grating angularly separates the multi-frequency optical signal into its constituent optical signals 124, 126 and 128 in accordance with their optical frequencies, the lowest-frequency optical signal 124 being diffracted through the greatest angle. Since the pitch of the diffraction grating is a minimum, the angle through which the diffraction grating diffracts the optical signals is a maximum.

The output optical path 112 is arranged to receive the optical signal 124 having the lowest optical frequency when the diffraction grating 102 is minimally stretched. The diffraction grating diffracts the optical signals 126 and 128 through different angles so that neither of them enters the output optical path. Consequently, the tunable optical filter 100 couples the output optical path to the input optical path at only the optical frequency of the optical signal 124, and effectively filters the optical signal 124 from the multi-frequency optical signal 122.

Figure 1B:
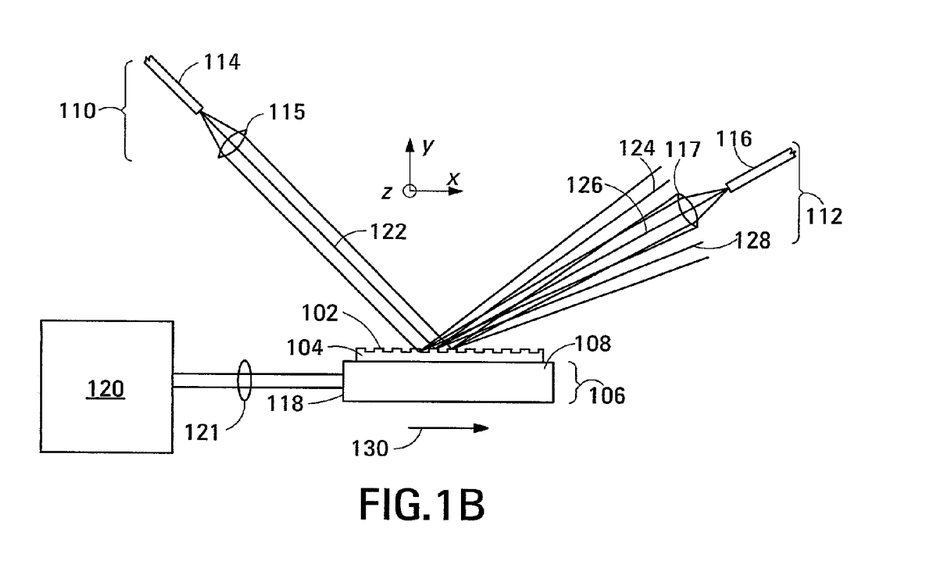
FIG. 1B is a schematic side elevation of the first embodiment of the tunable optical filter according to the invention shown with a control signal having a second level applied to the actuator.

To tune the tunable optical filter 100 to provide optical coupling between the output optical path and the input optical path for an optical signal having an optical frequency different from that of the optical signal 124 having the lowest optical frequency, the controller 120 applies a control signal different from that applied in FIG. 1A to the electrodes of the piezoelectric chip 108. FIG. 1B shows the tunable optical filter with a control signal different from that applied in FIG. 1A applied to the electrodes of the piezoelectric chip. The control signal causes the piezoelectric chip 108 to elongate in the x-direction, i.e., in the direction of the arrow 130. Elongating the piezoelectric chip stretches the elastic substrate 104 bonded to it. Stretching the elastic substrate increases the pitch of the diffraction grating 102 formed in the elastic substrate relative to the minimum pitch shown in FIG. 1A.

The diffraction grating 102 angularly separates the multi-frequency optical signal 122 into its constituent optical signals 124, 126 and 128 in accordance with their frequencies, as described above. The optical signal 124 having the lowest optical frequency is deflected through the greatest angle. However, since the pitch of the diffraction grating is more than the minimum shown in FIG. 1A, the angle through which the optical signals are diffracted is less than the maximum shown in FIG. 1A. The level of the control signal shown in FIG. 1B sets the pitch of the diffraction grating so that the diffraction grating diffracts the optical signal 126 through a diffraction angle that causes the optical signal 126 to enter the output optical path 112. The diffraction grating diffracts the optical signals 124 and 128 through different angles so that neither of these optical signals enters the output optical path. Consequently, the tunable optical filter 100 couples the output optical path to the input optical path at only the optical frequency of the optical signal 126, and effectively filters the optical signal 126 from the multi-frequency optical signal 122.

Similarly, the controller 120 may apply to the piezoelectric chip 108 a control signal of a level different from those shown in FIGS. 1A and 1B to cause the diffraction grating to optically couple the optical signal 128 having the highest frequency from the input optical path 110 to the output optical path 112. In each of the three examples just described, the diffraction grating optically couples the output optical path to the input optical path at an optical frequency, i.e., the optical frequency of the optical signal 124, 126 and 128, respectively, determined by the pitch of the diffraction grating.

In the above description, the optical paths 110 and 112 are respectively called the input optical path and the output optical path for the convenience of description. The tunable optical filter 100 may be operated in reverse to selectively couple an optical signal of a selected optical frequency from the optical path 112, acting as an input optical path, to the optical path 110, acting as an output optical path.

In an alternative embodiment, the tunable optical filter 100 includes an additional optical path (not shown) structured similar to the input optical path 110 or the output optical path 112. The additional optical path is located to receive the optical signal 126 when the pitch of the diffraction grating 102 is such that the output optical path 112 receives the optical signal 124. In this case, the diffraction grating couples the input optical path to the output optical path and additionally couples the input optical path to the additional optical path. At a different pitch of the diffraction grating, optical signals having frequencies different from those of optical signals 124 and 126 are selected and output via optical path 112 and the additional optical path. The optical filter may additionally include optical paths located to receive others or more of the optical signals diffracted by the diffraction grating.

The alternative embodiment of the tunable optical filter 100 just described may be operated in reverse. In this case, the optical path 112 operates as an input optical path to receive an optical signal having an optical frequency equal to that of optical signal 124, and the additional optical path operates as an input optical path to receive an optical signal having an optical frequency equal to that of optical signal 126. When its pitch is equal to that shown in FIG. 1A, the diffraction grating 102 couples the optical path 112 acting as an input optical path to the optical path 110 acting as an output optical path and additionally couples the additional optical path acting as an input optical path to optical path 110 acting as an output optical path. The diffraction grating overlaps the optical signals received via optical path 112 and the additional optical path to generate a multi-frequency optical signal that is output via optical path 110. At a different pitch of the diffraction grating, optical signals having frequencies different from those of optical signals 124 and 126 may be overlapped and output via optical path 110.

In a further alternative embodiment, the output optical path 112 has an aperture wide enough to receive more than one of the optical signals 124, 126 and 128. In this case, the tunable optical filter filters groups of optical signals adjacent in optical frequency from the multi-frequency optical signal 122.

The tuning range of the tunable optical filter 100 may be increased by making the polarity of the control signal reversible. A control signal of a polarity opposite to that which causes the piezoelectric chip to expand in the x-direction, as described above, causes the piezoelectric chip 108 to contract in the x-direction. The piezoelectric chip contracting in the x-direction negatively stretches the elastic substrate 104 and decreases the pitch of the diffraction grating 102 relative to the pitch obtained with the piezoelectric chip neither expanded nor contracted. In such an embodiment, the elastic substrate is minimally stretched and the pitch of the diffraction grating is a minimum when level of the control signal is a maximum in the reverse direction. The ability of elastic substrate to stretch negatively may be improved by stretching the elastic substrate prior to bonding it to the piezoelectric chip. Alternatively, a reverse-polarity control signal may be applied to the piezoelectric chip to set the piezoelectric chip to a contracted state and the elastic substrate is bonded to the piezoelectric chip with the piezoelectric chip in the contracted state.

The tunable optical filter 100 shown in FIGS. 1A and 1B operates open-loop, i.e., the controller sets the control signal to a pre-determined value to set the optical frequency at which the diffraction grating optically couples the input optical path to the output optical. This requires that the actuator have a stable and repeatable control voltage to expansion characteristic. A second embodiment 200 of a tunable filter that operates closed loop will now be described with reference to FIGS. 2A and 2B. Elements of the tunable filter 200 that correspond to elements of the tunable filter 100 described above with reference to FIGS. 1A and 1B are indicated using the same reference numerals and will not be described again here.

Figure 2A:
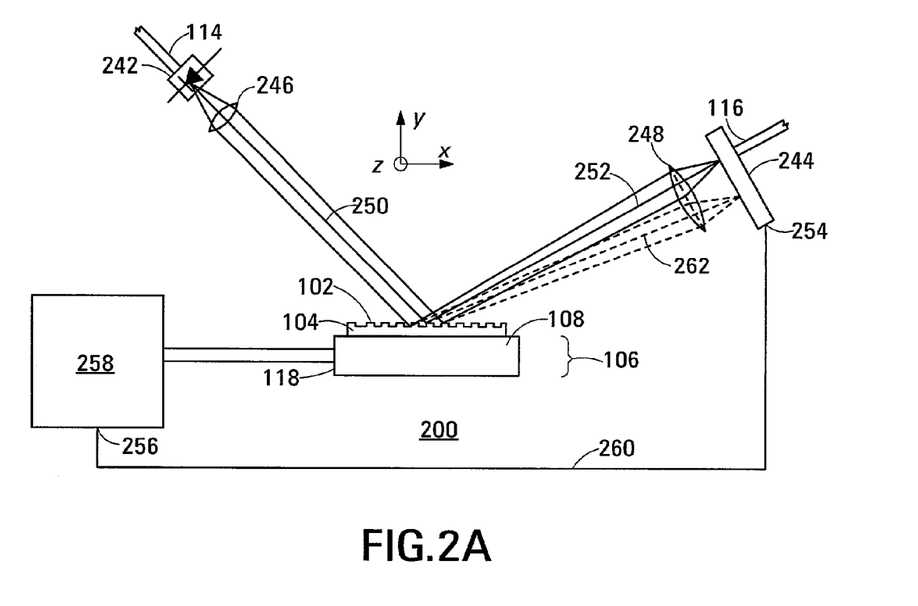
FIG. 2A is a schematic side elevation of a second embodiment of a tunable optical filter according to the invention.
Figure 2B:
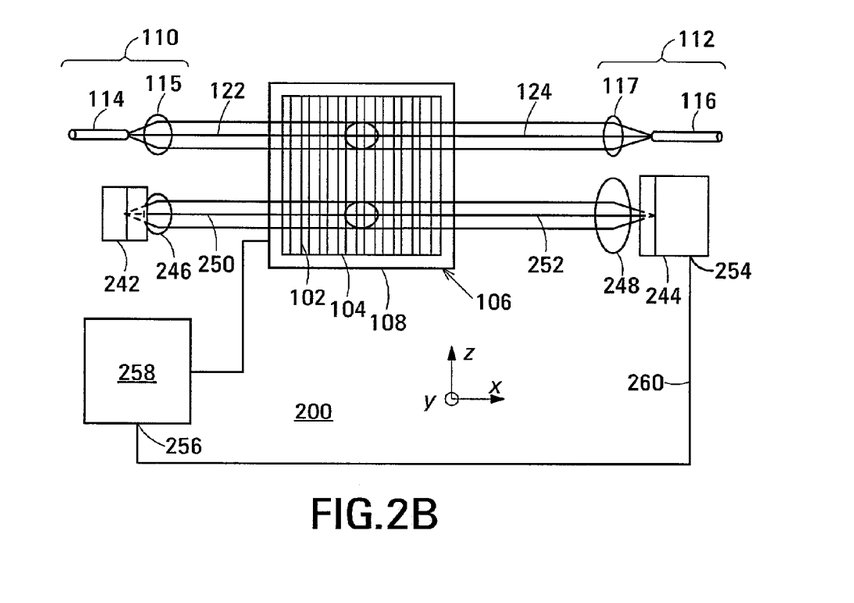
FIG. 2B is a schematic plan view of the second embodiment of a tunable optical filter according to the invention.

The tunable optical filter 200 additionally comprises the laser 242, the light detector array 244 and the converging elements 246 and 248. The laser is mounted substantially alongside the input optical path 110 but is separated from the input path in the z-direction. The converging element 246 is located between the laser and the diffraction grating 102 and collimates the light output by the laser to form the reference beam 250. The reference beam travels parallel to the multi-frequency optical signal 122 output by the input optical path 110 and is separated from the multi-frequency optical signal in the z-direction. The reference beam illuminates a portion of the diffraction grating 102 separated in the z-direction from the portion illuminated by the multi-frequency optical signal. The diffraction grating diffracts the reference beam as the diffracted reference beam 252.

The light detector array 244 is located adjacent the output optical path 112 but is separated from the output optical path in the z-direction. The converging element 248 is located between the light detector array and the diffraction grating 102. The converging element focuses the diffracted reference beam 252 onto the light detector array. The detector array includes an electrical output 254 connected to a feedback input 256 of the closed-loop controller 258 by the conductor 260.

The light detector array 244 includes a light detector (not shown) corresponding to each of the optical signals included in the multi-frequency optical signal 122. Each detector is located in the position to which the diffraction grating 102 deflects the diffracted reference beam 252 when the pitch of the diffraction grating is equal to that at which the diffraction grating additionally diffracts each of the optical signals 124, 126 and 128 (FIG. 1A) into the output optical path 112. FIG. 2A shows the diffracted reference beam 252 (solid line), which is the reference beam diffracted by the diffraction grating when the pitch of the diffraction grating is equal to that at which the diffraction grating additionally diffracts the optical signal 124 having the lowest optical frequency into the output optical path 112. FIG. 2A additionally shows the diffracted reference beam 262 (broken line), which is the reference beam diffracted by the diffraction grating when the pitch of the diffraction grating is equal to that at which the diffraction grating additionally diffracts the optical signal 126 (FIG. 1A) having the middle optical frequency into the output optical path 112. The diffracted reference beams 252 and 262 illuminate different ones of the light detectors constituting the light detector array 244.

The light detector array 244 generates an electrical feedback signal in response to the reference beam 250 diffracted by the diffraction grating 102. The feedback signal is fed via the conductor 260 to the feedback input 254 of the closed-loop controller 258. The feedback signal at least identifies the light detector of the light detector array illuminated by the diffracted reference beam, e.g., 252. The closed-loop controller operates in response to the feedback signal to generate the control signal that causes the actuator 106 to stretch the elastic substrate 104 by the amount necessary for the diffraction grating 102 to deflect the desired one of the optical signals 124, 126, 128 into the output optical path 112.

The feedback signal generated by the light detector array 244 may additionally indicate the intensity of the diffracted reference beam, e.g., 252 illuminating one or more of the light detectors of the light detector array to increase the accuracy with which closed-loop controller 258 causes the diffraction grating 102 to deflect the desired one of the optical signals into the output optical path 112.

In the tunable optical filters described above, the dispersion characteristics of the diffraction grating 102 cause the optical signals 124, 126 and 128 diffracted by the diffraction grating 102 to have a greater time dispersion than the corresponding components of the multi-frequency optical signal 122. Moreover, the diffraction efficiency of the diffraction grating is polarization dependent so that the diffraction grating has different diffraction efficiencies with respect to the TM and TE polarization components of a given optical signal. This makes the tunable optical filters described above also polarization dependent.

Figures 3A, 3B:
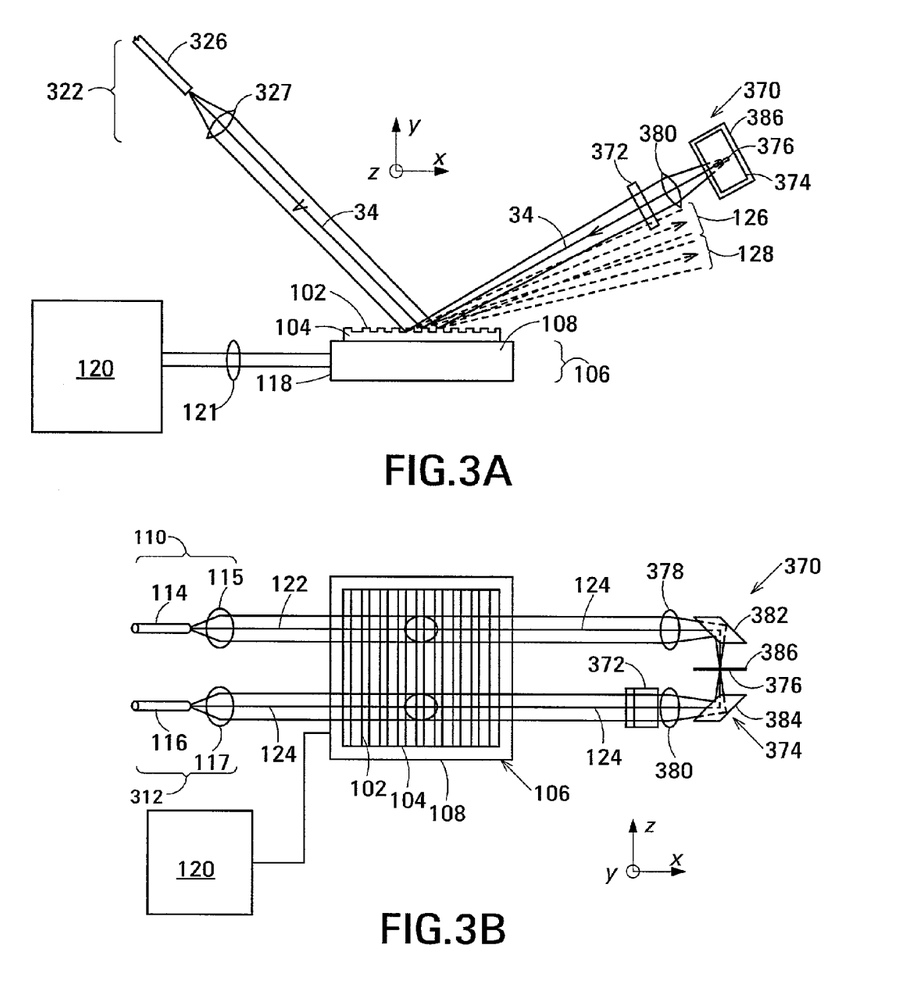
FIG. 3A is a schematic side elevation of a third embodiment of a tunable optical filter according to the invention.
FIG. 3B is a schematic plan view of the third embodiment of a tunable optical filter according to the invention.

FIGS. 3A and 3B show a third embodiment 300 of a tunable optical filter according to the invention for use in applications in which the time dispersion and polarization sensitivity of the embodiments described above are undesirable. Elements of the tunable filter 300 that correspond to elements of the tunable filter 100 described above with reference to FIGS. 1A and 1B are indicated using the same reference numerals and will not be described again here. The tunable optical filter is shown in a state corresponding to that shown in FIG. 1A, i.e., the state in which the actuator 106 sets the pitch of the diffraction grating 102 such that, of the optical signals 124, 126 and 128 constituting the multi-frequency optical signal 122, the optical signal 124 is diffracted into the output optical path.

In the tunable optical filter 300, the output optical path 312 is located substantially alongside the input optical path 110 but is separated from the input optical path in the −z-direction. The optical filter additionally includes the beam reverser and selector 370 and the half-wave plate 372. The beam reverser and selector is located substantially at the location of the output optical path 112 in the embodiments shown in FIGS. 1A and 2A to receive the light diffracted by the diffraction grating 102. The beam reverser and selector is structured to select an angular range of the light received from the diffraction grating and to return the selected angular range of the light to the diffraction grating. The diffraction grating then diffracts the light received from the beam reverser and selector into the output optical path 312. The half-wave plate is located in the optical path between the beam reverser and selector and the diffraction grating 102 and is oriented with its principal axes at 45° with respect to the TE and TM modes defined by the diffraction grating 102.

In the example shown, the beam reverser and selector 370 receives the optical signals 124, 126 and 128 diffracted by the diffraction grating 102. The beam reverser and selector selects an angular range of the optical signals 124, 126 and 128. In so doing, the beam reverser and selector acts as the above-described frequency-selective aperture that determines the range of optical frequencies that the diffraction grating couples between the input optical path and the output optical path at a given pitch. In the example shown, the beam reverser and selector selects the optical signal 124 and returns the optical signal 124 to the diffraction grating 102. On its way back to the diffraction grating, the optical signal 124 passes through the half-wave plate 372. The diffraction grating diffracts the optical signal 124 a second time. On the second diffraction, the diffraction grating diffracts the optical signal 124 through an angle that enables the optical signal 124 to enter the output optical path 312. The second diffraction may additionally reverse the temporal and spatial dispersion caused by the first diffraction.

For the second diffraction of the optical signal 124 by the diffraction grating 102 to reverse the temporal and spatial dispersion caused by the first diffraction, the corner reflector 374 that constitutes part of the beam reverser and selector 370 in the example shown in FIGS. 3A and 3B is oriented so that the line of intersection between its reflective surfaces, or between lateral extensions of the reflective surfaces if the reflective surfaces do not intersect, is orthogonal to the lines of the diffraction grating 102. This aligns the line of intersection parallel to the plane of dispersion of the diffraction grating. An orientation significantly different from that described would increase the temporal and spatial dispersion on the second diffraction. Such increased temporal and spatial dispersion is undesirable in many applications.

The half-wave plate 372, whose principal axes are oriented as described above, interchanges the TE and TM polarization components of the optical signal 124 for the second diffraction of the optical signal 124 by the diffraction grating 102. Interchanging the TE and TM components compensates for any difference in the diffraction efficiency of the diffraction grating with respect to the two polarization components. Accordingly, in the second diffraction of the optical signal 124, the TM and TE components interchanged relative to the first diffraction, so that the difference in diffraction efficiency is equal and opposite to that of the first diffraction. This makes the tunable optical filter 300 polarization independent.

In the example shown in FIG. 3A, the beam reverser and selector 370 is composed of the corner reflector 374, the slit 376 and the converging elements 378 and 380. The corner reflector is tilted so that the angle of incidence of the optical signal 124 on the corner reflector is substantially normal. The corner reflector returns the optical signal 124 back to a portion of the diffraction grating 102 displaced in the −z-direction from the portion of the diffraction grating illuminated by the multi-frequency optical signal 122, as shown in FIG. 3B. The slit 376 is located mid-way between the reflective elements of the corner reflector. The converging element 378 is structured and arranged to focus the light beam 124 on the slit. The converging element 380 is structured and arranged to collimate the light beam 124 diverging from the slit.

To the extent that optical signals 126 and 128 pass through the converging element 378 and are reflected by the corner reflector 374, these optical signals are offset from the slit 376 in a direction orthogonal to the length of the slit. Accordingly, these optical signals do not pass through the slit. The slit selects only the optical signal 124 and only the optical signal 124 is reflected once more by the corner reflector and is diffracted by the diffraction grating 102 into the output optical path 322. In a state corresponding to that shown in FIG. 1B, the optical signal 124 is offset from the slit, and the optical signal 126 passes through the slit and is reflected once more by the corner reflector and is diffracted by the diffraction grating 102 into the output optical path 322.

In the example shown, the corner reflector 374 is composed of the plane mirrors 382 and 384 arranged orthogonally to one another. The plane mirrors provide the reflective surfaces of the corner reflector. The plane mirrors are aligned with the line of intersection between lateral extensions of them orthogonal to the lines of the diffraction grating 102, as described above. The slit 376 is defined in the plane 386 arranged at 45° to the plane of both mirrors. Prisms may be used instead of the plane mirrors, as is known in the art. A concave mirror may be substituted for each combination of a converging element and a plane mirror, e.g., the combination of the converging element 378 and the plane mirror 382.

Figure 3C:
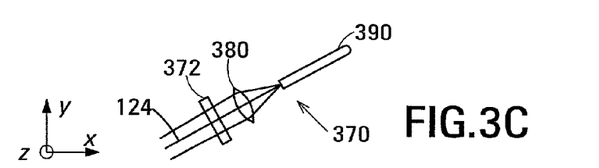
FIG. 3C is a schematic side elevation of part of the third embodiment of the tunable optical filter shown in FIG. 3A showing an alternative embodiment of the beam reverser and selector.
Figure 3D:
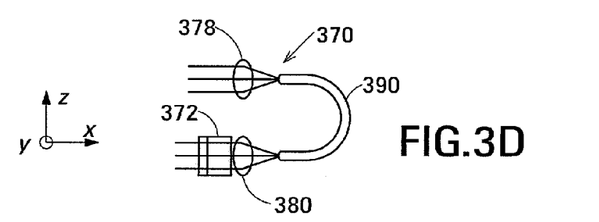
FIG. 3D is a schematic plan view of part of the third embodiment of the tunable optical filter shown in FIG. 3A showing the alternative embodiment of the beam reverser and selector.

FIGS. 3C and 3D show a portion of the tunable filter 300 incorporating an alternative embodiment of the beam reverser and selector 370. The tunable optical filter is shown in a state corresponding to that shown in FIG. 1A in which the optical signal 124 is diffracted into the output optical path. In this embodiment, the beam reverser and selector is composed of the U-shaped optical fiber 390 waveguide and the converging elements 378 and 380. This embodiment is also shown as including the half-wave plate 372.

The optical waveguide 390 is aligned with the path of the optical signal 124 when the diffraction grating is in a state corresponding to that shown in FIG. 3A. The ends of the optical waveguide are located at the focal points of the converging elements 378 and 380. The core of the optical waveguide performs the beam selection. In the state of the diffraction grating shown, the optical signal 124 is diffracted at an angle that allows it to enter the core of the optical waveguide. To the extent that optical signals 126 and 128 pass through the converging element 378, such optical signals are offset from the core of the optical waveguide in a direction orthogonal to the longitudinal axis of the waveguide and therefore do not enter the core of the optical waveguide. As a result, only the optical signal 124 is transmitted by the optical waveguide and is re-emitted by the optical waveguide towards the diffraction grating 102. After diffraction by the diffraction grating, the optical signal 124 enters the output optical path 322.

In the example shown, an optical fiber is shown as the optical waveguide 390. In embodiments that include the half-wave plate 372, the optical fiber is a polarization-maintaining optical fiber (PMF). Alternatively, a U-shaped optical waveguide formed on a suitable substrate can be used as the optical waveguide. The principal axes of the optical waveguide are aligned with those of the diffraction grating 102. Moreover, the curvature of the optical waveguide is greater than the minimum bend radius specified for the optical waveguide to prevent coupling between the modes of the fiber.

The tuned optical filter 300 may additionally include the closed-loop controller 258 and its associated laser 242 and detector array 244, described above with reference to FIGS. 2A and 2B.

FIGS. 4A–4E show additional embodiments of the tunable optical filter according to the invention incorporating some exemplary alternative embodiments of the actuator 106. Elements of the tunable optical filters shown in FIGS. 4A–4E that correspond to elements of the tunable filter 100 described above with reference to FIG. 1A are indicated using the same reference numerals and will not be described again here. The input optical path 120, the output optical path 122 and the controller 120 shown in FIG. 1A have been omitted from FIGS. 4A–4E to simplify the drawing. The embodiments shown in FIGS. 4A–4E can additionally include one or both of the closed-loop controller 258 and its associated laser 242 and detector array 244 described above with reference to FIGS. 2A and 2B and the beam reverser and selector 370 and its associated elements described above with reference to FIGS. 3A and 3B.

An embodiment 400 of a tunable optical filter according to the invention incorporating a second embodiment the actuator 106 will now be described with reference to FIG. 4A, and with additional reference to FIG. 1A. The actuator is composed of the piezoelectric chip 402. The piezoelectric chip and the elastic substrate 104 in which the diffraction grating 102 is formed are mounted in the L-shaped frame 404 that includes the base 406 and the support 408. The end 410 of the elastic substrate 104 and the end 412 of the piezoelectric chip 402 are fixed to the support 408. The coupling element 414 couples the end 416 of the elastic substrate remote from the end 410 to the end 418 of the piezoelectric chip remote from the end 412. The end 418 of the piezoelectric chip is free to move in the x-direction and, via the coupling element 414, determines the position of the end 416 of the elastic substrate 104 in the x-direction. Electrodes (not shown) supported by the piezoelectric chip, or otherwise arranged to apply an electric field to the piezoelectric chip, are electrically connected to the controller 120.

When the control signal applied by the controller 120 subjects the piezoelectric chip to minimal elongation, the diffraction grating 102 has its minimum pitch, and the diffraction grating diffracts the optical signal 124 having the lowest optical frequency into the output optical path 112. To set the diffraction grating to diffract an optical signal different from the optical signal 124 into the output optical path, the controller applies a control signal of a different level to the electrodes. The piezoelectric chip expands in the x-direction in response to the control signal. The coupling element 414 couples the expansion of the piezoelectric chip to stretch the elastic substrate 104 and increase the pitch of the diffraction grating 102 formed in the substrate, as described above.

An embodiment 500 of a tunable optical filter according to the invention incorporating a third embodiment the actuator 106 will now be described with reference to FIG. 4B, and with additional reference to FIG. 1A. The actuator is composed of the piezoelectric chip 502. The piezoelectric chip and the elastic substrate 104 are mounted in the U-shaped frame 504 that includes the base 506 and the supports 508 and 510 that extend from the base substantially orthogonally thereto and parallel to one another. The end 410 of the elastic substrate 104 in which the diffraction grating 102 is formed is fixed to the support 508, and the end 416 of the elastic substrate remote from the end 410 is coupled to the end 512 of the piezoelectric chip. The end 514 of the piezoelectric chip, remote from the end 512, is fixed to the support 510. The junction between the end 512 of the piezoelectric chip and the end 416 of the elastic substrate 104 is free to move in the x-direction. Electrodes (not shown) supported by the piezoelectric chip, or otherwise arranged to apply an electric field to the piezoelectric chip, are electrically connected to the controller 120.

When the control signal applied to the electrodes by the controller 120 subjects the piezoelectric chip 502 to minimal contraction, the diffraction grating 102 has its minimum pitch and the diffraction grating diffracts the optical signal 124 having the lowest optical frequency into the output optical path 112. To set the diffraction grating to diffract an optical signal different from the optical signal 124 into the output optical path, the controller applies a control signal of a different level to the electrodes. The piezoelectric chip contracts in the x-direction in response to the control signal. The contraction of the piezoelectric chip stretches the elastic substrate 104 and increases the pitch of the diffraction grating 102 formed in the substrate, as described above.

An embodiment 600 of a tunable optical filter according to the invention incorporating a fourth embodiment the actuator 106 will now be described with reference to FIG. 4C, and with additional reference to FIG. 1A. The actuator is composed of the linear motor 602. In the example shown, the linear motor is an electrostatic motor composed of the translator 604 and the stator 606. An example of a suitable linear electrostatic stepping motor is described in U.S. Pat. No. 5,986,381 of Hoen et al., assigned to the assignees of this disclosure and, for the United States, incorporated into this disclosure by reference. The translator is mounted relative to the stator by the high aspect ratio folded-beam flexures 608. The flexures allow the translator to move freely in the x-direction but constrain movement the translator in the y- and z-directions.

Electrodes, elongate in the z-direction and arrayed in the x-direction are located on the opposed surfaces of the translator 604 and the stator 606, separated from one another by a narrow gap. The electrodes are electrically connected to the controller to establish a spatially-alternating voltage pattern on the translator and a spatially-alternating voltage pattern with a phase reversal every n electrodes on the stator. An exemplary translator electrode is shown at 610 and an exemplary stator electrode is shown at 612. For every n stator electrodes there are n±1 translator electrodes.

Other forms of electrostatic, electromagnetic or other linear motors may alternatively be used as the linear motor 602.

The linear motor 602 and the elastic substrate 104 in which the diffraction grating 102 is formed are mounted in the U-shaped frame 614. The U-shaped frame is composed of the base 616 and the supports 618 and 620 that extend substantially orthogonally from the base, substantially parallel to one another. The coupling member 622 is coupled to the translator 604.

The end 410 of the elastic substrate 104 is attached to the support 618. The end 416 of the elastic substrate, remote from the end 410, is attached to the coupling member 622. The coupling member is positioned relative to the translator such that, in the rest position of the translator 604 defined by the flexures 608, the translator applies minimal tension to the substrate. In this state, the pitch of the diffraction grating 102 is a minimum, and the diffraction grating diffracts the optical signal 124 having the lowest optical frequency into the output optical path 112.

To set the diffraction grating 102 to diffract an optical signal different from the optical signal 124 having the lowest optical frequency into the output optical path 112, the controller changes the voltage pattern applied to stator electrodes to step the phase inversion along the stator 606. This moves the translator 604 in the x-direction. Moving the translator in the x-direction stretches the elastic substrate 104 and increases the pitch of the diffraction grating 102 formed in the substrate, as described above.

An embodiment 700 of a tunable optical filter according to the invention incorporating a fifth embodiment the actuator 106 will now be described with reference to FIG. 4D, and with additional reference to FIG. 1A. The actuator is composed of the rotary motor 702 and the rotary-to-linear motion converter 704. The input of the rotary motor is connected to the controller 120. The output shaft 706 of the rotary motor provides motive power to the motion converter. The motion converter converts the rotary motion of the output shaft to move the actuator link 708 linearly in the x-direction. Mechanical, hydraulic, pneumatic or other types of motion translators may be used.

The rotary motor 702, the motion converter 704 and the elastic substrate 104 in which the diffraction grating 102 is formed are mounted in the L-shaped frame 710. The L-shaped frame is composed of the base 712 and the support 714 that extends substantially orthogonally from the base. The rotary motor and the motion converter are mounted on the base.

The end 410 of the elastic substrate 104 in which the diffraction grating 102 is formed is fixed to the support 714, and the end 416 of the elastic substrate, remote from the end 410, is coupled to the actuator link 708. The actuator link has a rest position in which it applies a minimal tension to the substrate. In the rest position of the actuator link, the pitch of the diffraction grating is a minimum, and the diffraction grating diffracts the optical signal 124 having the lowest optical frequency into the output optical path 112.

To set the diffraction grating 102 to deflect an optical signal different from the optical signal 124 into the output optical path 112, the controller feeds a control signal to the rotary motor 702. The control signal causes the rotary motor to rotate the output shaft 706 and the motion translator 704 translates the rotary motion of the output shaft into linear motion of the actuator link 708 in the x-direction. The motion of the actuator link stretches the elastic substrate 104 and increases the pitch of the diffraction grating 102 formed in the substrate, as described above.

Figure 4A:
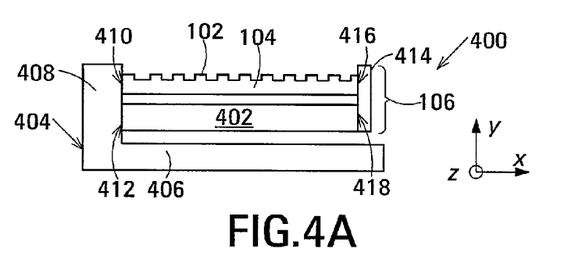
FIGS. 4A–4E are schematic side elevations of parts of additional embodiments of the tunable optical filter according to the invention showing alternative embodiments of the actuator.
Figure 4B:
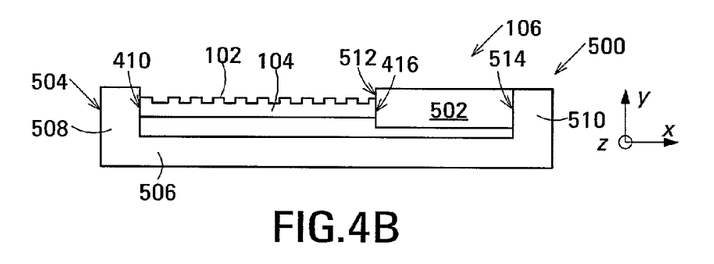
Figure 4C:
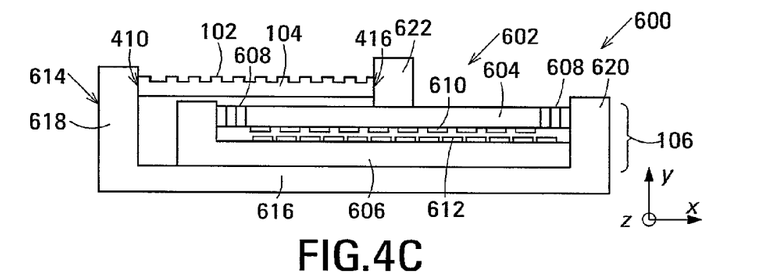
Figure 4D:
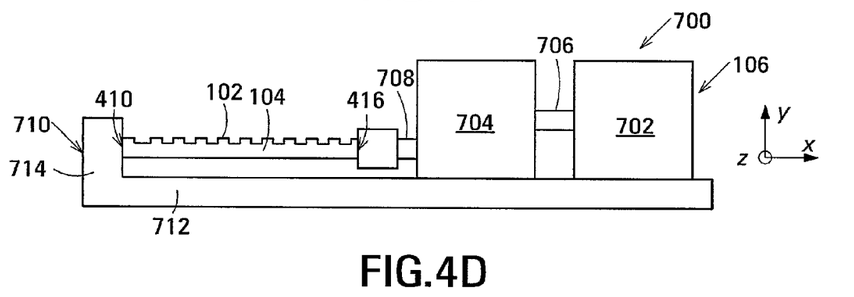

A more compact arrangement may be obtained by mounting the elastic substrate 104 over the rotary motor 702 and the motion translator 704 in a manner similar to the way the elastic substrate is mounted over the piezoelectric chip 402 shown in FIG. 4A.

Figure 4E:
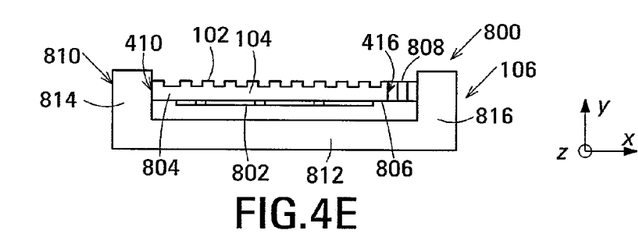

An embodiment 800 of a tunable optical filter according to the invention incorporating a sixth embodiment the actuator 106 will now be described with reference to FIG. 4E, and with additional reference to FIG. 1A. The actuator is composed of the electric heater element 802 thermally and mechanically coupled to the elastic substrate 104 and connected to receive a control signal from the output of the controller 120.

In an example, the elastic substrate 104 is a chip 804 of low electrical conductivity, single-crystal silicon in which the diffraction grating 102 is etched as an array of v-shaped grooves. The electric heater element is formed by covering the backside 806 of the chip with a layer of metal having a low thermal coefficient of resistivity. The layer is patterned to define an elongate, serpentine conductive trace as the heating element 802. Processes for depositing patterned layers of metal on silicon are known in the art and will not be described here.

Alternatively, the heating element may be formed in the silicon chip 804 by diffusing a suitable impurity into the backside 806 of the chip to define an elongate, serpentine channel semiconductor material having a higher electrical conductivity than the remainder of the chip. Processes for forming regions of increased electrical conductivity in silicon are known in the art and will not be described here. As a further alternative, an additional substrate (not shown) that supports the heating element 802, or in which the heating element is fabricated, may be bonded to the elastic substrate 104. The elastic substrate and the additional substrate may be of different materials from one another. Moreover, either or both of the substrates may be of materials different from single-crystal silicon.

The electrical heating element 802 and the elastic substrate 104 in which the diffraction grating 102 is formed are mounted in the U-shaped frame 810. The U-shaped frame is composed of the base 812 and the supports 814 and 816 that extend from the base substantially orthogonal thereto, and parallel to one another.

The end 410 of the chip 804 that provides the elastic substrate 104 in which the diffraction grating 102 is formed is fixed to the support 814. The end 416 of the chip, remote from the end 410, is shaped to define the high aspect ratio folded-beam flexure 808. The flexure allows the end 416 to move freely in the x-direction but constrains movement the end 416 in the y- and z-directions. A separate component may alternatively be used as the bending flexure 808. An element other than a bending flexure may alternatively be used to support the end 416 of the chip 804.

The controller 120 generates the control signal at a level that heats the heating element 802, and, hence, the chip 804 to a temperature at which the diffraction grating 102 is minimally stretched and the pitch of the diffraction grating 102 is a minimum. In this state, the diffraction grating diffracts the optical signal 124 having the lowest optical frequency into the output optical path 112. To set the diffraction grating to diffract an optical signal different from the optical signal 124 into the output optical path, the controller feeds a control signal at a different level through the heating element. The heating element dissipates additional heat that raises the temperature of the chip 804 and causes the chip to expand in the x-direction in proportion to the temperature rise. This increases the pitch of the diffraction grating 102 formed in the substrate, as described above.

One or more diodes (not shown) may additionally be fabricated in the chip 804. The controller 120 may feed current through the diodes and may measure the voltage across the diodes to determine the temperature of the chip. The controller then feeds current through the heating element to set the temperature of the chip to a desired temperature, as indicated by the voltage measured across the diodes. At the desired temperature the pitch of the diffraction grating is such that the diffraction grating diffracts the desired optical signal into the output optical path. Additionally or alternatively, the arrangement described above with reference to FIGS. 2A and 2B may be used to provide closed-loop control of the pitch of the grating 102.

The invention has been described above with reference to examples in which the multi-frequency optical signal is diffracted by a diffraction grating. However, this is not critical to the invention. The diffraction grating is an example of a diffractive element, and the optical signal carried by the input optical path may be diffracted by other types of diffractive element, such as a diffractive optical element or a hologram.

The invention has been described with reference to examples in which the multi-frequency optical signal is multi-frequency in the sense that it is composed of multiple, i.e., two or more, simultaneously-present optical signals, each of a different optical frequency. Examples of such a multi-frequency optical signal include WDM optical signals and DWDM optical signals. When the multi-frequency optical signal consists of multiple, simultaneously-present optical signals, the diffraction grating 102 couples part of the multi-frequency optical signal into the output optical path, i.e., the diffraction grating couples one (or more) of the optical signals of which the multi-frequency optical signal is composed into the output optical path. The optical frequency of the one of the optical signals coupled into the output optical path is determined by the pitch of the diffraction grating.

However, it is not critical to the invention that the multi-frequency optical signal be composed of multiple, simultaneously-present optical signals. The multi-frequency optical signal may alternatively consist of no more than one optical signal at a time, and is multi-frequency in the sense that the one optical signal can have a different optical frequency at different times. When the multi-frequency optical signal consists of no more than one optical signal at a time, the diffraction grating 102 couples the entire optical signal into the output optical path when its pitch is appropriately set by the actuator 106 stretching the elastic substrate 104.

The invention has been described with reference to examples in which the diffraction grating operates by reflection. However, this is not critical to the invention. With a suitable relocation of the output optical path, the diffraction grating may operate by transmission. In this case, the substrate in which the diffraction grating is formed is optically transparent and no reflective metal film is applied to the surface of the substrate.

This disclosure describes the invention in detail using illustrative embodiments. However, it is to be understood that the invention defined by the appended claims is not limited to the precise embodiments described.

We claim:

1. A tunable optical filter, comprising: an elastic substrate having a major surface;
   a diffractive element defined in the major surface of the elastic substrate, the diffractive element having a pitch;
   actuator means for stretching the elastic substrate to control the pitch of the diffractive element;
   a first optical path disposed non-parallel to the major surface; and
   a second optical path optically coupled to the first optical path by the diffractive element at an optical frequency determined by the pitch of the diffractive element.

2. The tunable optical filter of claim 1, additionally comprising a third optical path optically coupled to the first optical path by the diffractive element at an optical frequency different from that at which the first optical path is optically coupled to the second optical path at a given pitch of the diffractive element.

3. The tunable optical filter of claim 1, additionally comprising a controller connected to control the actuator means.

4. The tunable optical filter of claim 3, additionally comprising a feedback arrangement coupled to control to the controller.

5. The tunable optical filter of claim 1, in which the actuator means includes a piezoelectric chip comprising a major surface to which the elastic substrate is bonded.

6. The tunable optical filter of claim 1, in which the actuator means includes a piezoelectric chip mechanically coupled to the elastic substrate.

7. The tunable optical filter of claim 1, in which the actuator means includes a linear motor mechanically coupled to the elastic substrate.

8. The tunable optical filter of claim 7, in which the linear motor is an electrostatic linear motor.

9. The tunable optical filter of claim 7, in which the linear motor is an electromagnetic linear motor.

10. The tunable optical filter of claim 1, in which:
    the actuator means includes a rotary motor and a rotary-to-linear motion converter;
    the rotary motor provides motive power to the motion converter; and
    the motion converter includes a linear motion output mechanically coupled to the elastic substrate.

11. The tunable optical filter of claim 1, in which the actuator means includes:
    a thermally-expansive element mechanically coupled to the elastic substrate; and
    a heating element thermally coupled to the thermally-expansive element.

12. The tunable optical filter of claim 11, in which:
    the thermally-expansive element includes a major surface; and
    the elastic substrate is bonded to the major surface of the thermally-expansive element.

13. The tunable optical filter of claim 11, in which the heating element is integral with the thermally-expansive element.

14. The tunable optical filter of claim 13, in which the elastic substrate is additionally integral with the thermally-expansive element.

15. The tunable optical filter of claim 1, in which the second optical path is angularly separated from the first optical path.

16. A tunable optical filter, comprising:
an elastic substrate;
a diffractive element in the elastic substrate, the diffractive element having a pitch;
actuator means for stretching the elastic substrate to control the pitch of the diffractive element;
a first optical path;
a second optical path optically coupled to the first optical path by the diffractive element at an optical frequency determined by the pitch of the diffractive element; and
a feedback arrangement coupled to control to the controller, the feedback arrangement comprising:
  a light source arranged proximate to the first optical pat to illuminate the diffractive element with a reference beam of light;
  a light detector array arranged proximate to the second optical path to receive the reference beam diffracted by the diffractive element; and
  an electrical connection from the light detector array to the controller.

17. A tunable optical filter, comprising:
an elastic substrate;
a diffractive element in the elastic substrate, the diffractive element having a pitch;
actuator means for stretching the elastic substrate to control the pitch of the diffractive element;
a first optical path;
a second optical path optically coupled to the first optical path by the diffractive element at an optical frequency determined by the pitch of the diffractive element; and
a beam reverser and selector located to receive light diffracted by the diffractive element as received light and structured to select an angular range of the received light as selected light and to return the selected light to the diffractive element for diffraction into the output optical path.

18. The tunable optical filter of claim 17, additionally comprising a half-wave plate located between the beam reverser and selector and the diffractive element.

19. The tunable optical filter of claim 17, in which the beam reverser and selector includes:
a corner reflector comprising two reflective surfaces; and
a slit located between the reflective surfaces.

20. The tunable optical filter of claim 19, in which the beam reverser and selector additionally includes:
a first converging element structured to focus the received light on the slit; and
a second converging element structured to collimate the selected light diverging from the slit.

21. The tunable optical filter of claim 17, in which the beam reverser and selector includes a substantially U-shaped length of optical fiber.

22. The tunable optical filter of claim 21, in which the beam reverser and selector additionally includes:
a first converging element structured to focus the received light on the optical fiber, and
a second converging element structured to collimate the selected light diverging from the optical fiber.

* * * * *

UNITED STATES PATENT AND TRADEMARK OFFICE
CERTIFICATE OF CORRECTION

PATENT NO. : 7,027,688 B2  Page 1 of 1
APPLICATION NO. : 10/146543
DATED : April 11, 2006
INVENTOR(S) : Kenneth Wildnauer It is certified that error appears in the above-identified patent and that said Letters Patent is hereby corrected as shown below:

Col. 15 Line 19 In Claim 16, delete "pat" and insert -- path --, therefor.

Signed and Sealed this

Seventeenth Day of February, 2009

JOHN DOLL
*Acting Director of the United States Patent and Trademark Office*